United States Patent
Kamikawa (10) Patent No.: US 10,247,248 B2
(45) Date of Patent: Apr. 2, 2019

(54) DRIVE SHAFT AND MANUFACTURING METHOD THEREFOR

(71) Applicant: HONDA MOTOR CO., LTD., Tokyo (JP)

(72) Inventor: Mitsuru Kamikawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 164 days.

(21) Appl. No.: 15/416,210

(22) Filed: Jan. 26, 2017

(65) Prior Publication Data

US 2017/0227059 A1 Aug. 10, 2017

(30) Foreign Application Priority Data

Feb. 9, 2016 (JP) .................. 2016-022417

(51) Int. Cl.
*F16B 7/00* (2006.01)
*F16D 3/06* (2006.01)
(Continued)

(52) U.S. Cl.
CPC .............. *F16D 3/06* (2013.01); *F16C 3/02* (2013.01); *F16C 3/023* (2013.01); *F16C 3/026* (2013.01);
(Continued)

(58) Field of Classification Search
CPC .... F16C 3/02; F16C 2226/40; F16C 2208/02; F16D 3/06; F16D 2250/0069;
(Continued)

(56) References Cited

U.S. PATENT DOCUMENTS

| 1,506,739 A | * | 9/1924 | Eaton | F16C 3/02 310/265 |
| 2,329,601 A | * | 9/1943 | Frye | F16C 3/02 403/293 |

(Continued)

FOREIGN PATENT DOCUMENTS

| JP | 05-060122 | 3/1993 |
| JP | 05-215119 | 3/1993 |
| JP | 2014-222069 | 11/2014 |

OTHER PUBLICATIONS

Japanese Office Action dated Sep. 12, 2017, English translation included, 5 pages.

*Primary Examiner* — Amber R Anderson
*Assistant Examiner* — Nahid Amiri
(74) *Attorney, Agent, or Firm* — Rankin, Hill & Clark LLP (57) ABSTRACT

A drive shaft includes a first shaft member made of metal, a tubular member made of CFRP, and a first exterior sleeve. The first shaft member is capable of being attached on one end side thereof to a first constant velocity joint, and has a first serrated part on which serrations are formed on another end side thereof. The tubular member is formed with a first fitting part fitted externally over the first serrated part. The first exterior sleeve covers the first fitting part by being disposed to extend over outer circumferential surfaces of the first shaft member and the tubular member. A film provided with a bonding assistance region and an adhesive are interposed between the outer circumferential surface of the tubular member and the inner circumferential surface of the first exterior sleeve.

8 Claims, 4 Drawing Sheets

(51) Int. Cl.
*F16C 3/02* (2006.01)
*F16D 1/027* (2006.01)
*F16D 1/068* (2006.01)
*F16D 3/205* (2006.01)
*F16D 3/223* (2011.01)
*F16B 4/00* (2006.01)
*B23P 19/02* (2006.01)
*B29C 65/48* (2006.01)
*B29C 65/00* (2006.01)
*B29L 31/00* (2006.01)
*B29C 65/50* (2006.01)
*B29C 65/76* (2006.01)

(52) U.S. Cl.
CPC ............ *F16D 1/027* (2013.01); *F16D 1/068* (2013.01); *F16D 3/2055* (2013.01); *F16D 3/223* (2013.01); *B23P 19/02* (2013.01); *B29C 65/48* (2013.01); *B29C 65/5007* (2013.01); *B29C 65/5057* (2013.01); *B29C 65/76* (2013.01); *B29C 66/1222* (2013.01); *B29C 66/1224* (2013.01); *B29C 66/5221* (2013.01); *B29C 66/52292* (2013.01); *B29C 66/5344* (2013.01); *B29C 66/721* (2013.01); *B29C 66/7212* (2013.01); *B29C 66/742* (2013.01); *B29C 66/74283* (2013.01); *B29C 66/8262* (2013.01); *B29L 2031/75* (2013.01); *F16B 4/004* (2013.01); *F16C 2208/02* (2013.01); *F16C 2226/40* (2013.01); *F16D 2003/22323* (2013.01); *F16D 2250/0069* (2013.01)

(58) Field of Classification Search
CPC ............ B29C 66/1222; B29C 66/1224; B29C 66/5221; B29C 66/52292; B29C 66/5344; B29C 66/721; B29C 66/7212; B29C 66/742; B29C 66/74283; B29C 66/8262; B29C 65/48; B29C 65/565; B29C 65/5007; B29C 65/5057; B29C 65/76; B29L 2031/75; F16B 4/004; B23P 19/02
USPC ........................................ 403/164, 293, 298
See application file for complete search history.

(56) References Cited

U.S. PATENT DOCUMENTS

| | | | | |
|---|---|---|---|---|
| 3,024,626 | A * | 3/1962 | Frischman | C21D 9/28 295/36.1 |
| 3,897,984 | A * | 8/1975 | Matheny, Jr. | B60K 5/1283 384/582 |
| 4,177,654 | A * | 12/1979 | Aucktor | F16C 3/02 464/140 |
| 4,248,062 | A * | 2/1981 | McLain | B29C 70/085 138/130 |
| 5,137,142 | A * | 8/1992 | Reeves | B65H 27/00 193/37 |
| 5,447,472 | A * | 9/1995 | Ide | E21B 4/02 175/107 |
| 6,319,337 | B1 * | 11/2001 | Yoshida | C22C 38/02 148/320 |
| 6,981,800 | B2 * | 1/2006 | Shibuya | B60B 27/00 384/544 |
| 7,399,230 | B2 * | 7/2008 | Sakurai | C21D 9/28 29/DIG. 49 |
| 7,635,307 | B2 * | 12/2009 | Curi | F16D 3/227 464/140 |
| 2005/0101392 | A1 * | 5/2005 | Sakurai | C21D 9/28 464/182 |
| 2006/0108026 | A1 * | 5/2006 | Ichikawa | C21D 7/06 148/320 |

* cited by examiner

DRIVE SHAFT AND MANUFACTURING METHOD THEREFOR

CROSS-REFERENCE TO RELATED APPLICATION

This application is based upon and claims the benefit of priority from Japanese Patent Application No. 2016-022417 filed on Feb. 9, 2016, the contents of which are incorporated herein by reference.

BACKGROUND OF THE INVENTION

Field of the Invention

The present invention relates to a drive shaft and a manufacturing method therefor, in which the drive shaft is connected to and transmits torque between constant velocity joints.

Description of the Related Art

In automobiles that are driven electrically or by an engine, power (rotational torque) is transmitted to the drive wheels from the engine or a motor through a power transmission device disposed between the drive wheels and a reduction gear. The power transmission device, in general, is equipped with constant velocity joints (constant velocity universal joints) arranged at an interval at two locations in an axial direction, and a drive shaft connected to the constant velocity joints and which transmits torque therebetween. More specifically, in order to suitably transmit the aforementioned torque, the drive shaft must be constituted from a material that is superior in torsional strength as well as fatigue strength. As the material for such a drive shaft, carbon steel, the hardness of which is increased by induction hardening, has generally been used.

Incidentally, in recent years, attempts have been made to lessen the weight of an automobile with the aim of reducing fuel consumption or the like. From this standpoint, in order to reduce the weight of the drive shaft within a range in which sufficient torsional strength and fatigue strength can be maintained, a reduction in diameter or a so-called thin-walled portion may be provided on the drive shaft. However, there is a limit to which weight can be reduced by such a technique.

Thus, in order to effectively reduce the weight of the drive shaft, for example, as the material of the drive shaft, there can be used a carbon fiber composite material (carbon fiber reinforced plastic, CFRP) which is lighter in weight than carbon steel. In this case, it is necessary that both ends of the drive shaft are formed in shapes that enable constant velocity joints to be attached thereon, and there is a concern that, if CFRP is used, sufficient machining precision cannot be obtained. On the other hand, the central part of the drive shaft has few restrictions on the shape thereof, as was described above. Consequently, opposite ends of the drive shaft are constituted from a metallic member such as carbon steel, whereas preferably the central part is composed of a CFRP member. In order to obtain such a drive shaft, it is necessary that the metallic member and the CFRP member be joined together.

As a method for firmly joining the metallic member and the CFRP member, a mechanical joining technique such as riveting or the like is generally known. Further, for example, as disclosed in Japanese Laid-Open Patent Publication No. 05-215119, in order to manufacture a propeller shaft, a method is proposed for joining the ends of a cylindrical metallic member and a CFRP member by an adhesive.

SUMMARY OF THE INVENTION

In the foregoing manner, with a method of mechanically joining a metallic material and a CFRP material, because it is necessary to pierce the metallic material and the CFRP material for insertion of rivets or the like therein, damaged regions or severed regions within the CFRP material tend to occur. In this case, the strength of the CFRP material decreases, and hence, since the strength of the drive shaft as a whole decreases, there is a concern that sufficient torsional strength and fatigue strength cannot be obtained. Further, an increase in weight cannot be avoided.

Furthermore, as in the joining method described in Japanese Laid-Open Patent Publication No. 05-215119, if joining is carried out using only an adhesive, it is likely for the bonding strength between the metallic material and the CFRP material to be insufficient. Consequently, in such a method as well, it is difficult to obtain a drive shaft equipped with adequate torsional strength and fatigue strength.

A principal object of the present invention is to provide a drive shaft having sufficient torsional strength and fatigue strength.

Another object of the present invention is to provide a drive shaft that can effectively be made lighter in weight.

Another object of the present invention is to provide a manufacturing method for manufacturing the aforementioned drive shaft.

According to an embodiment of the present invention, a drive shaft is provided that connects and transmits torque between respective constant velocity joints, comprising a shaft member made of metal, and configured to be attached on one end side thereof to one of the constant velocity joints, and including a serrated part on which serrations are formed on another end side thereof, a tubular member made from a carbon fiber composite material and formed with a fitting part fitted externally over the serrated part, and an exterior sleeve configured to cover the fitting part by being disposed to extend over outer circumferential surfaces of the shaft member and the tubular member, wherein an adhesive and a film provided with a bonding assistance region are configured to be interposed between an outer circumferential surface of the tubular member and an inner circumferential surface of the exterior sleeve.

On the drive shaft according to the present invention, a region where the constant velocity joint is attached is provided on one end side of the shaft member, which is made of a metallic material that is excellent in terms of machinability. Therefore, the one end side of the shaft member can be machined easily and with high accuracy, and can be formed into a shape to enable attachment of the constant velocity joint. Further, within the drive shaft, compared to the region where the above-described constant velocity joint is attached, a region thereof where there are few restrictions on shape is constituted from the tubular member made of CFRP, which is lighter in weight than metal. Owing to this feature, without decreasing machining precision, it is possible to effectively reduce the weight of the drive shaft.

Even if the drive shaft is constructed in this manner from the shaft member made of metal and the tubular member made of CFRP, the shaft member and the tubular member can be firmly joined to each other. More specifically, on the drive shaft, serrations are provided on the other end side of the shaft member, and by fitting the tubular member over the serrations, a fitting part is formed where the shaft member and the tubular member are serration-fitted together. The outer circumferential surfaces of the shaft member and the tubular member including the fitting part are covered by the exterior sleeve, which is disposed to extend over the shaft member and the tubular member.

Further, the film having the bonding assistance region and the adhesive are interposed between the exterior sleeve and the tubular member. The bonding assistance region serves to increase the bonding strength between the exterior sleeve and the tubular member. Consequently, combining the bonding strength of the adhesive with the bonding strength of the bonding assistance region, the exterior sleeve and the tubular member can be firmly joined together.

From the above, with the drive shaft, the shaft member and the tubular member are serration-fitted, and the fitting part is arranged in the interior of the exterior sleeve. Further, the exterior sleeve and the tubular member are firmly joined together through the film and the adhesive. Therefore, the bonding strength between the shaft member and the tubular member can be increased significantly, for example, much higher than the bonding strength provided by only an adhesive. Further, in contradistinction to a mechanical joining technique, damaged regions or severed regions in the carbon fibers inside the tubular member can be avoided. As a result, a drive shaft which is effectively made lighter in weight can be obtained, and which has torsional strength and fatigue strength of a sufficient size or magnitude in order to connect and transmit torque between the constant velocity joints.

In the above-described drive shaft, the bonding assistance region preferably comprises a suction pad structure. In this case, interior portions of the suction pad structure, which are crushed between the exterior sleeve and the tubular member, are placed in a reduced pressure state, whereby a suction force is generated. By such a suction force, the bonding strength between the exterior sleeve and the tubular member can be increased. Further, since the adhesive can be made to flow by becoming deformed or by other means when the suction pad structure is crushed, the adhesive can be filled thoroughly and evenly between the exterior sleeve and the tubular member. More specifically, with the present invention, entrainment of air, which inevitably occurs upon joining using an ordinary adhesive, can be avoided. Consequently, by both the suction force of the suction pad structure and the suitably filled adhesive, the exterior sleeve and the tubular member can be joined together more firmly. Further, an advantage is achieved in that the film prevents electrolytic corrosion of CFRP and steel.

In addition, even in the event there is a decrease in the adhesive strength of the adhesive due to some reason, due to the bonding assistance region constituted from the suction pad structure, the joined condition between the exterior sleeve and the tubular member can be maintained. Further, by adjusting the thickness of the film or the size of the suction pad structure, etc., the thickness of the adhesive layer can easily be adjusted. Furthermore, if the reduced pressure state of the suction cup structure is canceled together with melting of the adhesive, since the film can easily be peeled away from the exterior sleeve and the tubular member, maintainability also is excellent.

In the above-described drive shaft, the bonding assistance region preferably is composed of a plurality of members arranged in alignment with respect to the film. In this case, since it is possible to suppress variations in the bonding strength at each of respective locations of the film, joining of the exterior sleeve and the tubular member can be performed more effectively.

In the above-described drive shaft, the bonding assistance region preferably is disposed on both surfaces of the film. In this case, the bonding strength of the bonding assistance region is exerted effectively, and the exterior sleeve and the tubular member can be joined together more firmly.

In the above-described drive shaft, preferably, the exterior sleeve is made up from a large inner diameter section, an intermediate inner diameter section, and a small inner diameter section disposed between the large inner diameter section and the intermediate inner diameter section, inner diameters of which differ in size respectively, the large inner diameter section is configured to cover the tubular member through the film and the adhesive, the intermediate inner diameter section is configured to cover another region of the shaft member on which the serrations are not formed, the small inner diameter section is configured to be fitted externally over the serrated part, the shaft member and the exterior sleeve are configured to be positioned by abutment between a shaft member stepped part, which is formed between the serrated part and the other region of the shaft member, and a first stepped part, which is formed between the intermediate inner diameter section and the small inner diameter section of the exterior sleeve, and the exterior sleeve and the tubular member are configured to be positioned by abutment between a second stepped part, which is formed between the large inner diameter section and the small inner diameter section of the exterior sleeve, and an end surface of the tubular member.

In this case, by serration-fitting between the serrated part of the shaft member and the small inner diameter section of the exterior sleeve, the shaft member and the exterior sleeve can be joined together more firmly. Further, in the foregoing manner, since positioning of the shaft member and the tubular member with respect to the exterior sleeve can be carried out, dimensional accuracy in the lengthwise direction of the drive shaft can easily be increased.

According to another embodiment of the present invention, a manufacturing method is provided for a drive shaft, which connects and transmits torque between respective constant velocity joints, the drive shaft comprising a shaft member made of metal, the shaft member configured to be attached on one end side thereof to one of the constant velocity joints, and including a serrated part on which serrations are formed on another end side thereof. The method is characterized by an internal fitting step of internally fitting the other end side of the shaft member into an exterior sleeve, and an external fitting step of externally fitting a tubular member over the serrated part and thereby forming a fitting part, by pressing the tubular member, which is made of a carbon fiber composite material, into a gap formed between the serrated part and an inner circumferential surface of the exterior sleeve. In the external fitting step, in a state in which an adhesive and a film provided with a bonding assistance region are arranged along the inner circumferential surface of the exterior sleeve or an outer circumferential surface of the tubular member, the tubular member is press-fitted into the gap, whereby the film and the adhesive are interposed between the tubular member and the exterior sleeve.

With the manufacturing method for a drive shaft according to the present invention, in the internal fitting step, the other end side including the serrated part of the shaft member made of metal is fitted into the exterior sleeve. Owing to this feature, a gap is formed between the serrated part and the inner circumferential surface of the exterior sleeve. Next, in a state in which the film in which the bonding assistance region is provided and the adhesive are arranged along the inner circumferential surface of the exterior sleeve or the outer circumferential surface of the tubular member made of CFRP, the external fitting step is carried out in which the tubular member is press-fitted into the aforementioned gap. In accordance with this feature, it is possible to form the fitting part by externally fitting the tubular member over the serrated part, and together therewith, the film and the adhesive can be interposed between the tubular member and the exterior sleeve.

More specifically, the shaft member and the tubular member can be serration-fitted together, and the fitting part can be arranged in the interior of the exterior sleeve. Further, the exterior sleeve and the tubular member can be firmly joined together through the film and the adhesive. As a result, since the shaft member and the tubular member can be joined together firmly, a drive shaft can be obtained, which has torsional strength and fatigue strength of a sufficient size or magnitude, and which is effectively reduced in weight.

In the above manufacturing method for the drive shaft, as the bonding assistance region, a suction pad structure preferably is disposed on the film. In this case, in the external fitting step, when the film and the adhesive are interposed between the exterior sleeve and the tubular member, the suction pad structure is crushed and a suction force is generated, and together therewith, the adhesive is made to flow and entrainment and the like of air can be avoided. Consequently, by both the suction force of the suction pad structure and the suitably filled adhesive, the exterior sleeve and the tubular member can be joined together more firmly. In addition, even if there is a decrease in the adhesive strength of the adhesive, by providing the bonding assistance region in the form of the suction pad structure, the joined condition between the exterior sleeve and the tubular member can be maintained, the thickness of the adhesive layer can easily be adjusted, and maintainability can be enhanced.

In the above manufacturing method for the drive shaft, plural bonding assistance regions preferably are arranged in alignment with respect to the film. In this case, since variations in the bonding strength at each of respective locations of the film can be suppressed, joining of the exterior sleeve and the tubular member can be performed more effectively.

In the above manufacturing method for the drive shaft, the bonding assistance region preferably is disposed on both surfaces of the film. In this case, the bonding strength of the bonding assistance region of the film is exerted effectively, and the exterior sleeve and the tubular member can be joined together more firmly.

In the above-described manufacturing method for the drive shaft, preferably, the exterior sleeve is made up from a large inner diameter section, an intermediate inner diameter section, and a small inner diameter section disposed between the large inner diameter section and the intermediate inner diameter section, inner diameters of which differ in size respectively. In the internal fitting step, the shaft member and the exterior sleeve are positioned, together with the small inner diameter section being fitted externally over the serrated part, by insertion of the shaft member from a side of the intermediate inner diameter section of the exterior sleeve, and by abutment between a shaft member stepped part, which is formed between the serrated part and another region of the shaft member on which the serrations are not formed, and a first stepped part, which is formed between the intermediate inner diameter section and the small inner diameter section of the exterior sleeve. Further, in the external fitting step, the exterior sleeve and the tubular member are positioned, together with the film and the adhesive being interposed between the large inner diameter section and the tubular member, by press-insertion of the tubular member from a side of the large inner diameter section of the exterior sleeve, and by abutment between an end surface of the tubular member, and a second stepped part, which is formed between the large inner diameter section and the small inner diameter section of the exterior sleeve.

In this case, by serration-fitting between the serrated part of the shaft member and the small inner diameter section of the exterior sleeve, the shaft member and the exterior sleeve can be joined together more firmly. Further, in the foregoing manner, since the shaft member and the tubular member can easily be positioned with respect to the exterior sleeve, dimensional accuracy in the lengthwise direction of the drive shaft can easily be increased.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Concerning the drive shaft according to the present invention, a preferred embodiment in relation to a manufacturing method therefor will be described in detail below with reference to the accompanying drawings.

Figure 1:
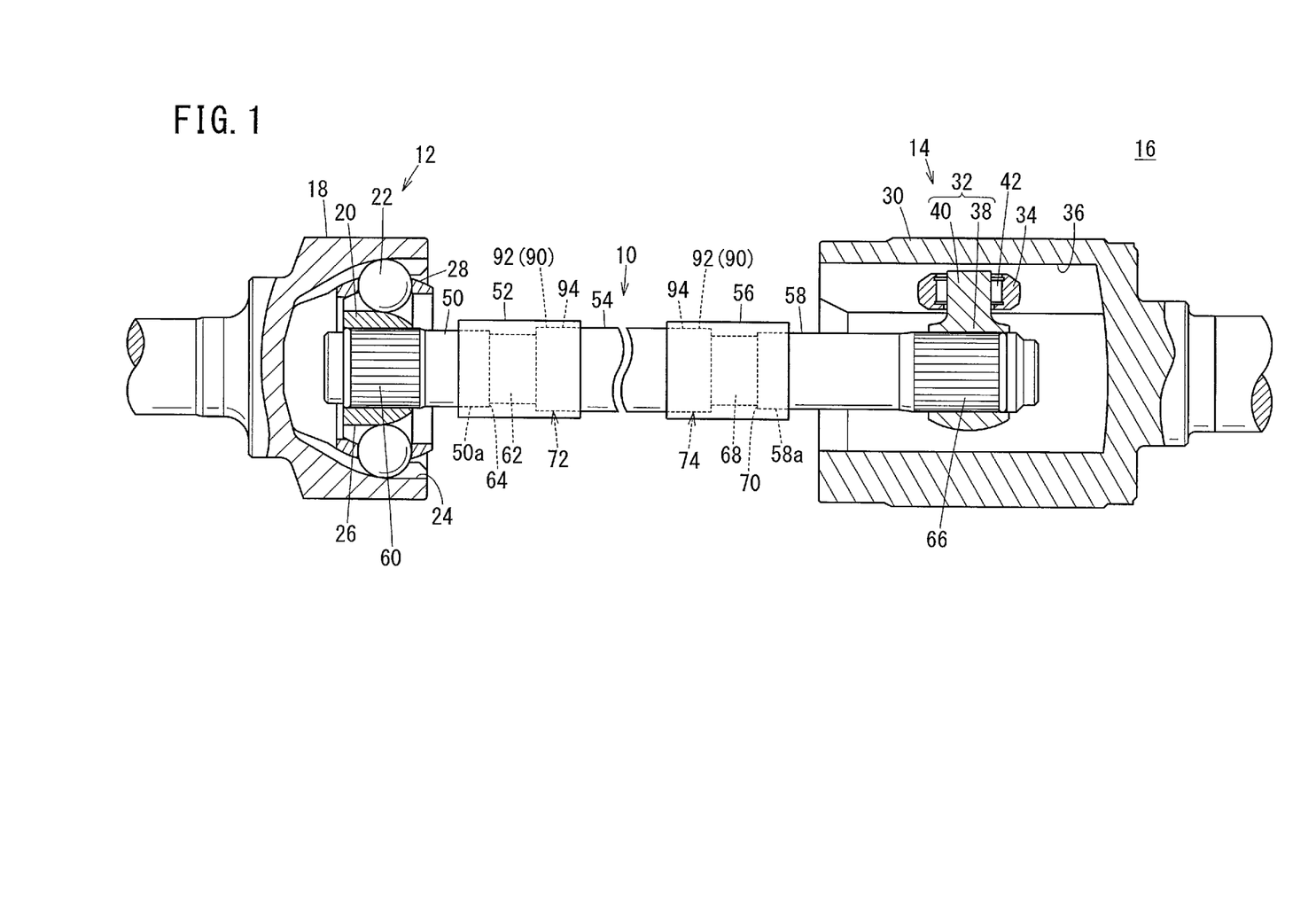
FIG. 1 is a schematic cross-sectional view of main components of a power transmission device on which there are mounted constant velocity joints on both ends of a drive shaft according to an embodiment of the present invention.

As shown in FIG. 1, a drive shaft 10 according to the present embodiment, together with a first constant velocity joint 12 and a second constant velocity joint 14, constitutes a power transmission device 16 of an automobile. First, the power transmission device 16 will be described.

The first constant velocity joint 12 is a Birfield type constant velocity joint on the outboard side, which is interposed between one end side (the left end side in FIG. 1) of the drive shaft 10 and a hub (not shown), and is constituted basically from an outer cup 18, an inner ring (race) 20, and balls 22. The outer cup 18 includes a cup-shaped part in which a bottomed hole is formed, and is connected integrally to the hub. On an inner surface of the outer cup 18 in the form of a spherical surface, a plurality of, for example, six, first ball grooves 24 are formed, which extend along the axial direction and at equal intervals, respectively, around a central axis.

The inner ring 20 is of an annular shape in which plural second ball grooves 26 are disposed on an outer circumferential wall thereof in corresponding relation to the aforementioned first ball grooves 24, and is accommodated in the interior of the outer cup 18. Further, the inner ring 20 is spline-fitted onto one end of the drive shaft 10 through a hole formed in the center thereof.

The balls 22 are arranged one each so as to be capable of rolling respectively between the mutually facing first ball grooves 24 and the second ball grooves 26, and are held in a retainer 28 interposed between an outer surface of the inner ring 20 and an inner surface of the outer cup 18. By the balls 22 each being in contact respectively with the first ball grooves 24 and the second ball grooves 26, transmission of torque is performed between the outer cup 18 and the inner ring 20.

A joint boot (not shown) made of rubber or resin and having a bellows portion thereon is installed between the outer cup 18 and the drive shaft 10. A grease composition serving as a lubricant is filled in the interior of the joint boot in a sealed manner.

The second constant velocity joint 14 is a tripod type constant velocity joint on the inboard side, which is interposed between another end side (the right end side in FIG. 1) of the drive shaft 10 and a differential gear (not shown), and is constituted basically from an outer ring (race) member 30, a spider 32, and rollers 34.

The outer ring member 30 includes a cup-shaped part in which a bottomed hole is formed, and is connected integrally with a differential gear. Three track grooves 36, for example, which are separated at equal intervals respectively around the axis, are formed on the inner surface of the outer ring member 30.

The spider 32 includes an annular part 38, and plural trunnions 40 that project out respectively from an outer circumferential wall of the annular part 38. The spider 32 is inserted into the outer ring member 30 in such a manner that the trunnions 40 are accommodated respectively inside the track grooves 36. Further, the annular part 38 is serration-fitted onto the other end of the drive shaft 10 through a hole that is formed in the center of the annular part 38.

The rollers 34 are annular shaped members, which are fitted rotatably on the trunnions 40 through a plurality of rolling bodies 42, and slide in contact with inner walls of the track grooves 36. Stated otherwise, by inner circumferential walls of the rollers 34 contacting the outer walls of the trunnions 40, and outer circumferential walls of the rollers 34 contacting the inner walls of the track grooves 36, transmission of torque is performed through the rollers 34 between the outer ring member 30 and the spider 32. The rolling bodies 42 may be roller bearings including, for example, needles, rollers, etc.

As with the joint boot discussed above, a joint boot (not shown) is installed between the outer ring member 30 and the drive shaft 10 in a sealed manner.

On the drive shaft 10, as noted above, the inner ring 20 of the first constant velocity joint 12 is spline-fitted onto one end side, and the spider 32 of the second constant velocity joint 14 is serration-fitted onto the other end side thereof. Therefore, for example, torque that is transmitted to the spider 32 from the outer ring member 30 is transmitted through the drive shaft 10 and from the inner ring 20 to the outer cup 18. Stated otherwise, the drive shaft 10 connects and transmits torque to the first constant velocity joint 12 and the second constant velocity joint 14.

The drive shaft 10 is constituted by arranging in order from one end side to the other end side thereof, a first shaft member 50, a first exterior sleeve 52, a tubular member 54, a second exterior sleeve 56, and a second shaft member 58.

The first shaft member 50, for example, is made from a metal such as steel, etc., and by lathe machining (turning process), a first mounting part 60 is provided on one end side (the left end side in FIG. 1), and a first serrated part 62 is provided on the other end side (the right end side in FIG. 1) thereof. Although the metal that forms the material of the first shaft member 50 is not limited in particular, for example, by component adjustment or induction hardening or the like, the hardness thereof preferably is set to a Rockwell hardness HRC of 55 or greater, and more preferably, is set to a Rockwell hardness HRC of 60 or greater.

The first mounting part 60 is a location where splines are formed that are spline-fitted with the inner ring 20 of the first constant velocity joint 12. The first serrated part 62 is a location where serrations are formed that are serration-fitted with the first exterior sleeve 52 and the tubular member 54. More specifically, on the other end side of the first shaft member 50, a first shaft member stepped part 64 is formed between the first serrated part 62 and another location 50a where serrations are not formed.

The second shaft member 58 is constituted in the same manner as the first shaft member 50, except that a second mounting part 66 is provided on one end side (the right side in FIG. 1) thereof. More specifically, a second serrated part 68 similar to the first serrated part 62 is provided on the other end side (the left end side in FIG. 1) of the second shaft member 58. The second mounting part 66 is a location where serrations are formed that are serration-fitted with the spider 32 (annular part 38) of the second constant velocity joint 14. Further, on the other end side of the second shaft member 58, a second shaft member stepped part 70 is formed between the second serrated part 68 and another location 58a where serrations are not formed.

The tubular member 54 is of a tubular shape made from a carbon fiber composite material (carbon fiber reinforced plastic, CFRP), one end side (the left side in FIG. 1) of which forms a first fitting part 72 that is fitted on the first serrated part 62 of the first shaft member 50, and another end side (the right end side in FIG. 1) of which forms a second fitting part 74 that is fitted on the second serrated part 68 of the second shaft member 58. In order to suitably form the first fitting part 72 and the second fitting part 74 in this manner, the inner diameter of the tubular member 54 preferably is set to be 0.1 to 1.5 mm smaller than the outer diameter of the first serrated part 62 and the second serrated part 68.

More specifically, by setting the difference between the aforementioned inner and outer diameters to be less than or equal to 1.5 mm, it is possible to prevent disengagement between the tubular member 54 and the first serrated part 62 and the second serrated part 68. Further, by setting the difference between the aforementioned inner and outer diameters to be greater than or equal to 0.1 mm, it is possible to prevent damage from occurring to the tubular member 54 when the tubular member 54 is fitted on the first serrated part 62 and the second serrated part 68.

Although the CFRP material that forms the tubular member 54 is not limited in particular, the tensile elastic modulus thereof preferably is greater than or equal to 230 GPa, and the tensile strength thereof preferably is greater than or equal to 3500 MPa.

Further, with the first fitting part 72, an adhesive preferably is interposed between the tubular member 54 and the first serrated part 62, and with the second fitting part 74, an adhesive preferably is interposed between the tubular member 54 and the second serrated part 68. Owing to this feature, joining of the tubular member 54 and the first shaft member 50, and joining of the tubular member 54 and the second shaft member 58 can be further strengthened.

The first exterior sleeve 52, for example, is made in a tubular shape from a metal or CFRP material, and is disposed to extend over (straddle across) the first shaft member 50 and the tubular member 54, or stated otherwise, is disposed in covering relation to the outer circumferential surface of the first shaft member 50 and the tubular member 54 including the first fitting part 72. The hardness of the first exterior sleeve 52 is not limited in particular, insofar as it is determined corresponding to the outer diameter, etc., of the first serrated part 62. However, for reasons to be discussed later, the Rockwell hardness HRC of the first exterior sleeve 52 is preferably from 40 to 50, and the difference in hardness between the first exterior sleeve 52 and the first shaft member 50 is preferably set to a Rockwell hardness HRC of 5 to 20. More preferably, the difference in hardness is 10 to 15.

Figure 2:
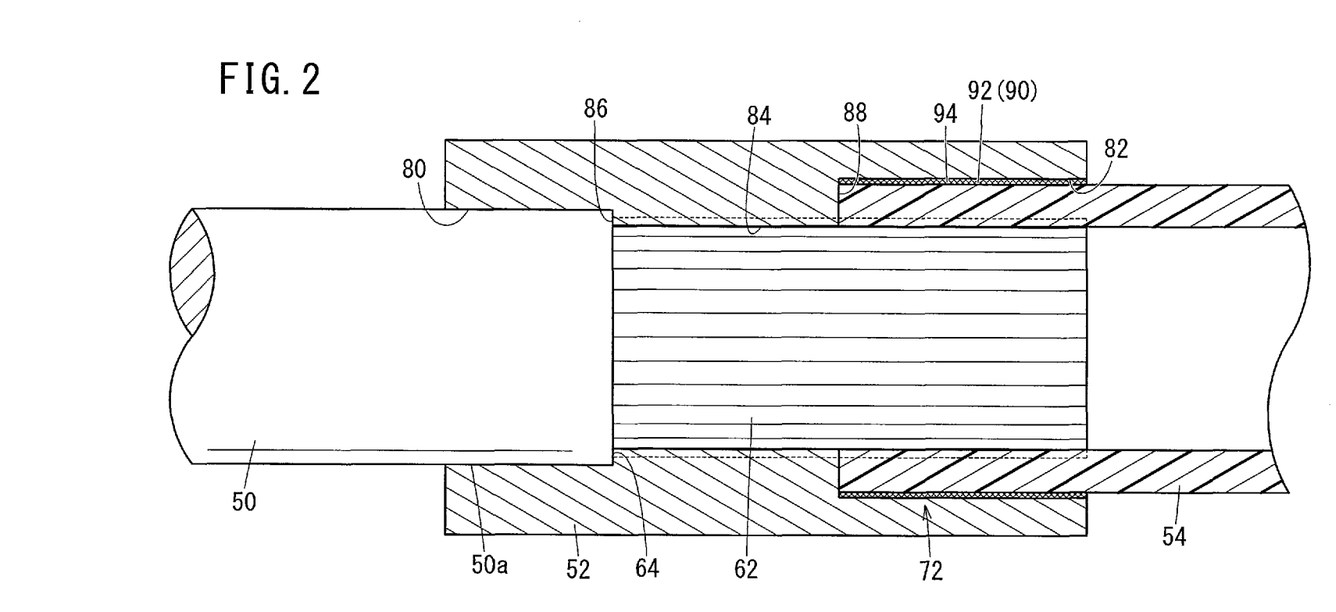
FIG. 2 is an enlarged view of main parts of the drive shaft of FIG. 1.

As shown in FIG. 2, the inner diameter of the first exterior sleeve 52 is constituted from an intermediate inner diameter section 80, a large inner diameter section 82, and a small inner diameter section 84 arranged between the intermediate inner diameter section 80 and the large inner diameter section 82, the sizes of which differ, respectively. More specifically, the intermediate inner diameter section 80, the small inner diameter section 84, and the large inner diameter section 82 are arranged in this order from the left end side to the right end side as shown in FIG. 2.

Because the intermediate inner diameter section 80 is larger in diameter than the small inner diameter section 84, a first stepped part 86 is formed between the small inner diameter section 84 and the intermediate inner diameter section 80. Further, the intermediate inner diameter section 80 covers the other location 50a of the first shaft member 50 that is inserted through the first exterior sleeve 52. At this time, the first shaft member 50 and the first exterior sleeve 52 are positioned by abutment between the first shaft member stepped part 64 and the first stepped part 86.

The small inner diameter section 84 is fitted over the first serrated part 62. More specifically, the first exterior sleeve 52 and the first shaft member 50 are joined by serration-fitting between the small inner diameter section 84 and the first serrated part 62.

An adhesive preferably is disposed in an intervening manner between the first shaft member 50, and the intermediate inner diameter section 80 and the small inner diameter section 84. Owing to this feature, the first exterior sleeve 52 and the first shaft member 50 can be joined together more firmly.

Because the large inner diameter section 82 is larger in diameter than the small inner diameter section 84, a second stepped part 88 is formed between the small inner diameter section 84 and the large inner diameter section 82. Further, the large inner diameter section 82 covers the first fitting part 72 through a film 92 having bonding assistance regions 90 and an adhesive 94. At this time, the tubular member 54 and the first exterior sleeve 52 are positioned by abutment between the second stepped part 88 and an end surface of the tubular member 54.

Figure 3:
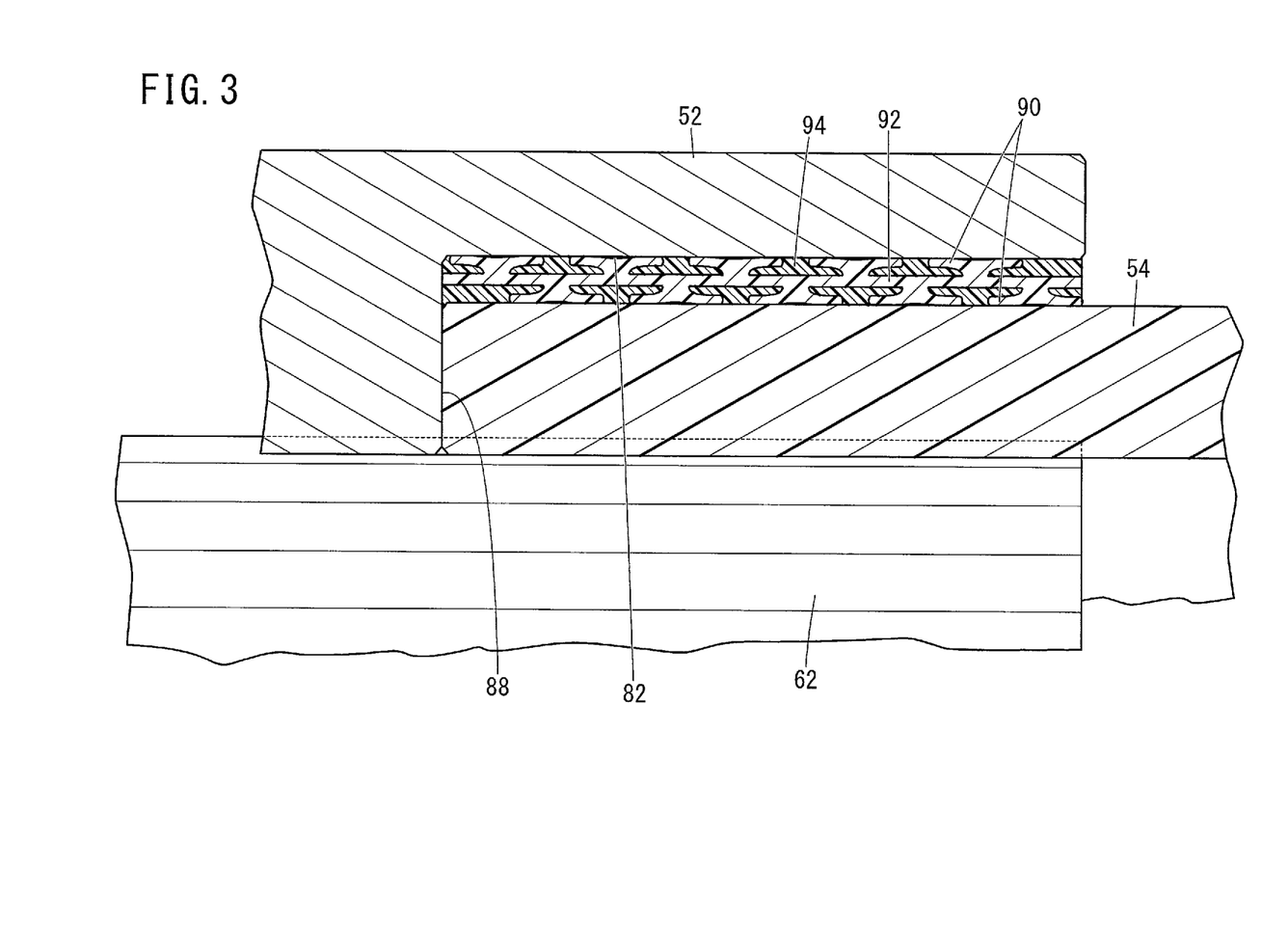
FIG. 3 is a schematic cross-sectional view for describing a film and an adhesive that are interposed between exterior sleeves and a tubular member of the drive shaft of FIG. 1.
Figure 4:
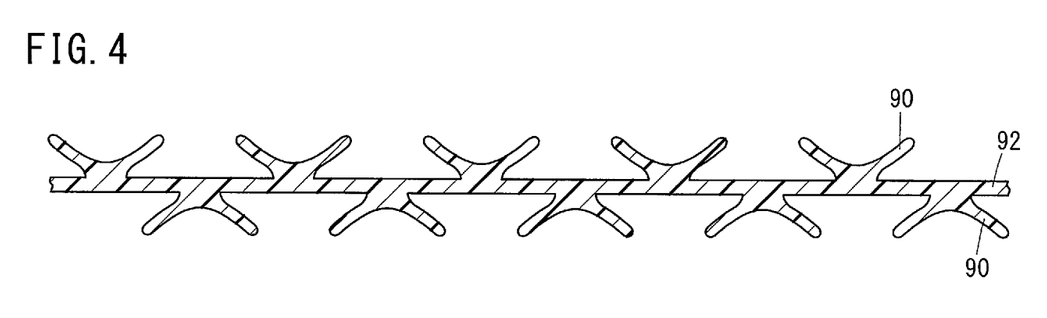
FIG. 4 is a schematic cross-sectional view for describing a suction pad structure of the film of FIG. 3.

As shown in FIGS. 3 and 4, the plural bonding assistance regions 90 are arranged in alignment on both surfaces of the film 92. The bonding assistance regions 90 are of a suction pad structure, the interiors of which are reduced in pressure by being crushed between the first exterior sleeve 52 and the tubular member 54. The shape and size of the suction pad structures that constitute the bonding assistance regions 90 are not particularly limited, insofar as they are capable of exerting a suction force due to the interiors thereof being reduced in pressure.

However, the size of the suction pad structures preferably is on the order of micrometers, so as to obtain a sufficient suction force, and to be capable of being interposed without excessively increasing the space between the first exterior sleeve 52 and the tubular member 54.

Among the dimensions of the film 92, the length in the circumferential direction along the circumference of the tubular member 54 preferably is substantially the same as the outer circumference of the tubular member 54. In this case, since the circumferential direction of the tubular member 54 can be covered without excess or insufficiency by the film 92, an adhesive strength can effectively be obtained by the bonding assistance regions 90.

Among other dimensions of the film 92, concerning the axial length along the axial direction of the tubular member 54, as the axial length thereof becomes greater, the adhesive strength can be increased by increasing the surface area of the film 92 on which the bonding assistance regions 90 are provided. However, if the axial length of the film 92 is excessively large, the operation to interpose the film 92 between the tubular member 54 and the first exterior sleeve 52 becomes difficult, and thus there is a concern that production efficiency of the drive shaft 10 will be lowered. Further, when the axial length of the film 92 interposed between the first exterior sleeve 52 and the tubular member 54 is large, it is also necessary for the length of the first exterior sleeve 52 in the axial direction to coincide therewith. Consequently, if the axial length of the film 92 is excessively large, there also is a concern that the weight of the drive shaft 10 will increase.

Thus, the axial length of the film 92 preferably is set so that an appropriate state of equilibrium is obtained between sufficiently increasing the adhesive strength provided by the bonding assistance regions 90, and avoiding an increase in weight or lowering of the production efficiency of the drive shaft 10. As the axial length of the film 92 having such qualities, a length which is 0.5 to 3.0 times, and more appropriately, a length which is 1.0 to 1.5 times the outer diameter of the tubular member 54 may be provided.

As shown in FIG. 3, the adhesive 94 is filled between the tubular member 54 and the first exterior sleeve 52 including between the plurality of bonding assistance regions 90, whereby the first exterior sleeve 52 and the tubular member 54 are adhered to each other through the film 92. Moreover, the type of the adhesive 94 is not limited in particular, insofar as it is capable of suitably bonding the first exterior sleeve 52 and the tubular member 54 to each other through the film 92 as noted above.

As shown in FIG. 1, in the same manner as the first exterior sleeve 52 that covers the outer circumferential surfaces of the first shaft member 50 and the tubular member 54 including the first fitting part 72, the second exterior sleeve 56 covers the outer circumferential surfaces of the tubular member 54 and the second shaft member 58 including the second fitting part 74. More specifically, since the second exterior sleeve 56 can be constituted in the same manner as the first exterior sleeve 52, detailed description of the second exterior sleeve 56 is omitted.

With the manufacturing method for the drive shaft 10 according to the present embodiment, as will be described below, the drive shaft 10 is obtained by joining the first shaft member 50 and the second shaft member 58, respectively, with respect to the tubular member 54. At this time, each of the first shaft member 50 and the second shaft member 58 can be joined to the tubular member 54 by being subjected mutually to the same process. Therefore, in the following description, an example of a method for joining the first shaft member 50 to the tubular member 54 will be described, whereas an explanation of details of the method for joining the second shaft member 58 to the tubular member 54 is omitted.

At first, an internal fitting step is carried out to insert the first serrated part 62 and the other location 50a of the first shaft member 50 from the intermediate inner diameter section 80 side of the first exterior sleeve 52. At this time, positioning of the first shaft member 50 and the first exterior sleeve 52 can easily be carried out by abutment between the first shaft member stepped part 64 and the first stepped part 86.

In the internal fitting step, the first serrated part 62 and the small inner diameter section 84 are serration-fitted, and together therewith, the other location 50a is internally fitted into the intermediate inner diameter section 80, whereby the first shaft member 50 and the first exterior sleeve 52 are joined to each other. Further, with such serration-fitting, by setting the difference in hardness between the first exterior sleeve 52 and the first shaft member 50 to lie within the above-described range, it is possible for a plastic flow to be created by biting of the first serrated part 62 into the first exterior sleeve 52. Therefore, the first exterior sleeve 52 and the first shaft member 50 can be joined together firmly. Further, in the case that the first exterior sleeve 52 is made of metal, for example, by broach machining or the like prior to performing the internal fitting step, serrations may be formed therein beforehand for fitting the first serrated part 62 to the small inner diameter section 84.

Furthermore, in the internal fitting step, preferably in a state in which an adhesive is coated on at least either one of the outer circumferential surface of the first serrated part 62 and the other location 50a, and the inner circumferential surface of the intermediate inner diameter section 80 and the small inner diameter section 84, the first shaft member 50 is inserted into the first exterior sleeve 52. In this case, since the intermediate inner diameter section 80 and the other location 50a, and the small inner diameter section 84 and the first serrated part 62 can be fitted together respectively, the first shaft member 50 and the first exterior sleeve 52 can be joined together more firmly.

As noted above, the distal end side of the first serrated part 62, which is inserted from the side of the intermediate inner diameter section 80 of the first exterior sleeve 52, arrives at the interior of the large inner diameter section 82 of the first exterior sleeve 52. Therefore, a gap is formed between the first serrated part 62 and the inner circumferential surface of the large inner diameter section 82 of the first exterior sleeve 52.

Next, the film 92 and the adhesive 94 are arranged along the inner circumferential surface of the large inner diameter section 82 of the first exterior sleeve 52, or the outer circumferential surface of the one end side (the left end side in FIG. 2) of the tubular member 54. In this state, the external fitting step is carried out, by which the one end side of the tubular member 54 is press-fitted into the gap between the large inner diameter section 82 and the first serrated part 62. At this time, the tubular member 54 is inserted into the gap until the end surface of the tubular member 54 comes into abutment against the second stepped part 88, whereby positioning can easily be performed between the first exterior sleeve 52 and the tubular member 54.

By the external fitting step, the film 92 and the adhesive 94 are interposed between the outer circumferential surface of the tubular member 54 and the inner circumferential surface of the large inner diameter section 82, together with forming the first fitting part 72 by fitting of the tubular member 54 over the first serrated part 62. At this time, the bonding assistance regions 90, which are made up from the suction pad structure of the film 92, are crushed between the tubular member 54 and the large inner diameter section 82, and the interiors thereof are placed in a pressure-reduced state. Further, in this manner, by the bonding assistance regions 90 undergoing deformation and causing the adhesive 94 to flow, while entrainment of air therein is avoided, the adhesive 94 can be filled thoroughly and evenly between the tubular member 54 and the large inner diameter section 82.

As a result, coupled with the adhesive strength of the bonding assistance regions 90 and the bonding strength of the suitably filled adhesive 94, the first exterior sleeve 52 and the tubular member 54 can be firmly joined together. In addition, even in the event there is a decrease in the adhesive strength of the adhesive 94 due to some reason, due to the bonding assistance regions 90, the joined condition between the first exterior sleeve 52 and the tubular member 54 can be maintained. Further, by adjusting the thickness of the film 92 or the length, etc., of the bonding assistance regions 90 that project out from the surfaces of the film 92, the thickness of the adhesive layer made up from the adhesive 94 can easily be adjusted. Furthermore, if the reduced pressure state of the bonding assistance regions 90 is canceled together with melting of the adhesive 94, since the film 92 can easily be peeled away from the first exterior sleeve 52 and the tubular member 54, maintainability also is excellent.

In the foregoing manner, by carrying out the internal fitting step and the external fitting step, the first fitting part 72 is arranged in the interior of the first exterior sleeve 52, and together therewith, both the first shaft member 50 and the tubular member 54 are joined firmly with respect to the first exterior sleeve 52. Owing to this feature, for example, the first shaft member 50 can be joined more firmly to the one end side of the tubular member 54, in comparison with performing bonding only by an adhesive. In the same manner, by firmly joining the second shaft member 58 to the other end side of the tubular member 54, the drive shaft 10 can be obtained.

More specifically, with the drive shaft 10, the first shaft member 50 and the second shaft member 58, which are made of metal that is superior in terms of machinability, are arranged on both end sides thereof. Therefore, the first mounting part 60 and the second mounting part 66 can be formed easily and with high precision, respectively, on the first shaft member 50 and the second shaft member 58, and the first constant velocity joint 12 and the second constant velocity joint 14 can be attached thereto. Further, by arranging the tubular member 54 made of CFRP, which is more lightweight than metal, between the first shaft member 50 and the second shaft member 58, the weight of the drive shaft 10 can effectively be reduced.

In the foregoing manner, even if the drive shaft 10 is constructed in this manner from the first shaft member 50 and the second shaft member 58, which are made of metal, and the tubular member 54, which is made of CFRP, as described above, the first shaft member 50 and the second shaft member 58 can be firmly joined, respectively, with respect to the tubular member 54. In addition, in contradistinction to a mechanical joining technique, damaged regions or severed regions in the carbon fibers inside the tubular member 54 can be avoided.

Consequently, it is possible to obtain the drive shaft 10, which is effectively made lighter in weight, and which has a torsional strength and a fatigue strength of sufficient size or magnitude in order to connect and transmit torque between the first constant velocity joint 12 and the second constant velocity joint 14.

The present invention is not limited to the embodiment described above, and modifications may be made to the embodiment without departing from the essence and gist of the invention.

In the above-described embodiment, the bonding assistance region 90 is made up from the suction pad structure shown in FIGS. 3 and 4. However, insofar as an adhesive strength is exerted between the tubular member 54 and both the first exterior sleeve 52 and the second exterior sleeve 56, the bonding assistance region 90 of the present invention is not limited to a suction pad structure that projects out from the surfaces of the film 92 as described above. For example, the bonding assistance region may be constituted from recesses or through holes that are formed in a film 92 made from an elastic body. In this case, the film 92, for example, is compressed between the first exterior sleeve 52 and the tubular member 54, whereby the interiors of the recesses or the through holes are placed in a pressure-reduced state and a suction force is generated.

Further, with the above-described embodiment, in order to increase the bonding strength, the bonding assistance regions 90 are provided on both surfaces of the film 92. However, from the standpoint of simplifying the film 92, the bonding assistance regions 90 may be provided only on either one of the surfaces of the film 92.

Furthermore, with the above-described embodiment, in order to suppress variations in the bonding strength at each of respective locations of the film 92, the bonding assistance regions 90 are composed of a plurality of members arranged in alignment on the film 92. However, the present invention is not limited to this feature. The number and manner of arranging the bonding assistance regions 90 that are disposed on the film 92 can be adjusted appropriately depending on the materials and conditions of use thereof.

What is claimed is:

1. A drive shaft that connects and transmits torque between respective constant velocity joints, comprising:
    a shaft member made of metal and configured to be attached on one end side thereof to one of the constant velocity joints, and including a serrated part on which serrations are formed on another end side thereof;
    a tubular member made from a carbon fiber composite material and formed with a fitting part fitted externally over the serrated part; and
    an exterior sleeve configured to cover the fitting part by being disposed to extend over outer circumferential surfaces of the shaft member and the tubular member;
    wherein an adhesive and a film provided with a bonding assistance region are configured to be interposed between an outer circumferential surface of the tubular member and an inner circumferential surface of the exterior sleeve, and
    wherein the bonding assistance region comprises a suction pad structure.

2. The drive shaft according to claim 1, wherein the bonding assistance region is composed of a plurality of the suction pad structure arranged in alignment with respect to the film.

3. The drive shaft according to claim 1, wherein the bonding assistance region is disposed on both surfaces of the film.

4. The drive shaft according to claim 1, wherein:
    the exterior sleeve is made up from a large inner diameter section, an intermediate inner diameter section, and a small inner diameter section disposed between the large inner diameter section and the intermediate inner diameter section, inner diameters of which differ in size respectively;
    the large inner diameter section is configured to cover the tubular member through the film and the adhesive;
    the intermediate inner diameter section is configured to cover another region of the shaft member on which the serrations are not formed;
    the small inner diameter section is configured to be fitted externally over the serrated part;
    the shaft member and the exterior sleeve are configured to be positioned by abutment between a shaft member stepped part, which is formed between the serrated part and the other region of the shaft member, and a first stepped part, which is formed between the intermediate inner diameter section and the small inner diameter section of the exterior sleeve; and
    the exterior sleeve and the tubular member are configured to be positioned by abutment between a second stepped part, which is formed between the large inner diameter section and the small inner diameter section of the exterior sleeve, and an end surface of the tubular member.

5. A manufacturing method for a drive shaft that connects and transmits torque between respective constant velocity joints, the drive shaft comprising a shaft member made of metal, the shaft member configured to be attached on one end side thereof to one of the constant velocity joints, and including a serrated part on which serrations are formed on another end side thereof, the method comprising:
    an internal fitting step of internally fitting the other end side of the shaft member into an exterior sleeve; and
    an external fitting step of externally fitting a tubular member over the serrated part and thereby forming a fitting part, by pressing the tubular member, which is made of a carbon fiber composite material, into a gap formed between the serrated part and an inner circumferential surface of the exterior sleeve;
    wherein, in the external fitting step, in a state in which an adhesive and a film provided with a bonding assistance region are arranged along the inner circumferential surface of the exterior sleeve or an outer circumferential surface of the tubular member, the tubular member is press-fitted into the gap, whereby the film and the adhesive are interposed between the tubular member and the exterior sleeve, and
    wherein the bonding assistance region comprises a suction pad structure disposed on the film.

6. The manufacturing method for the drive shaft according to claim 5, wherein plural bonding assistance regions are arranged in alignment with respect to the film.

7. The manufacturing method for the drive shaft according to claim 5, wherein the bonding assistance region is disposed on both surfaces of the film.

8. The manufacturing method for the drive shaft according to claim 5, wherein:
    the exterior sleeve is made up from a large inner diameter section, an intermediate inner diameter section, and a small inner diameter section disposed between the large inner diameter section and the intermediate inner diameter section, inner diameters of which differ in size respectively;

in the internal fitting step, the shaft member and the exterior sleeve are positioned, together with the small inner diameter section being fitted externally over the serrated part, by insertion of the shaft member from a side of the intermediate inner diameter section of the exterior sleeve, and by abutment between a shaft member stepped part, which is formed between the serrated part and another region of the shaft member on which the serrations are not formed, and a first stepped part, which is formed between the intermediate inner diameter section and the small inner diameter section of the exterior sleeve; and in the external fitting step, the exterior sleeve and the tubular member are positioned, together with the film and the adhesive being interposed between the large inner diameter section and the tubular member, by press-insertion of the tubular member from a side of the large inner diameter section of the exterior sleeve, and by abutment between an end surface of the tubular member, and a second stepped part, which is formed between the large inner diameter section and the small inner diameter section of the exterior sleeve.

\* \* \* \* \*